United States Patent
Wei et al.

(10) Patent No.: US 11,303,492 B2
(45) Date of Patent: Apr. 12, 2022

(54) COMB ADAPTATION FOR INTERLACED FDM DMRS

(71) Applicant: QUALCOMM Incorporated, San Diego, CA (US)

(72) Inventors: Chao Wei, Beijing (CN); Wanshi Chen, San Diego, CA (US); Peter Gaal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 450 days.

(21) Appl. No.: 16/326,355

(22) PCT Filed: Mar. 24, 2017

(86) PCT No.: PCT/CN2017/078005
§ 371 (c)(1),
(2) Date: Feb. 18, 2019

(87) PCT Pub. No.: WO2018/058920
PCT Pub. Date: Apr. 5, 2018

(65) Prior Publication Data
US 2021/0281464 A1    Sep. 9, 2021

(30) Foreign Application Priority Data

Sep. 30, 2016   (WO) ............... PCT/CN2016/101146

(51) Int. Cl.
*H04L 27/26* (2006.01)
*H04L 1/08* (2006.01)
*H04L 5/00* (2006.01)

(52) U.S. Cl.
CPC .......... *H04L 27/26136* (2021.01); *H04L 1/08* (2013.01); *H04L 5/0048* (2013.01); *H04L 27/2605* (2013.01); *H04L 27/26035* (2021.01)

(58) Field of Classification Search
CPC ......... H04L 27/26136; H04L 27/26035; H04L 1/08; H04L 5/0048; H04L 27/2605
See application file for complete search history.

(56) References Cited

U.S. PATENT DOCUMENTS 9,172,513 B2   10/2015   Gaal et al.
2013/0022087 A1   1/2013   Chen et al.
(Continued)

FOREIGN PATENT DOCUMENTS

CN   102740479 A   10/2012
CN   103004163 A   3/2013
(Continued)

OTHER PUBLICATIONS

Huawei et al., "Uplink DMRS Enhancement to Support More Orthogonal Partial Overlapped Ports", 3GPP TSG RAN WG1 Meeting #86, R1-166141, Aug. 26, 2016, 5 pages.
(Continued)

*Primary Examiner* — Duc C Ho
(74) *Attorney, Agent, or Firm* — QUALCOMM Incorporated

(57) ABSTRACT

Comb adaptation for interlaced frequency division multiplex (IFDM) demodulation reference signals (DMRS) is discussed. Transmission configuration for DMRS may be assigned to UEs with a coded combination of cyclic shift, OCC, and comb value. Some assigned combinations provide for a different comb value to be used for the different slots
(Continued)

500
Determine a transmission configuration for DMRS in a subframe for each of a plurality of served UEs, wherein the transmission configuration includes a combination of at least a cyclic shift, an OCC, and a comb value.

501
Dynamically signal the transmission configuration to each of the plurality of served UEs, wherein at least one of the transmission configurations assigns a first comb value for a first slot of the subframe and a second comb value for a second slot of the subframe that is different than the first comb value.

in the same subframe. Further aspects provide additional interference randomization through comb shifting, using inter-subframe hopping functions. Additionally, where retransmissions are present without uplink grant, the UE may select comb values for retransmissions based on the counter number for the retransmissions, which are different than the comb values used for the original DMRS transmissions.

16 Claims, 10 Drawing Sheets

(56) References Cited

U.S. PATENT DOCUMENTS

| | | | |
|---|---|---|---|
| 2013/0114547 | A1 | 5/2013 | Li et al. |
| 2014/0211736 | A1* | 7/2014 | Noh .................. H04W 56/0005 370/329 |
| 2014/0328329 | A1 | 11/2014 | Novlan et al. |
| 2015/0264588 | A1 | 9/2015 | Li et al. |
| 2016/0080060 | A1 | 3/2016 | Yu et al. |
| 2016/0249307 | A1 | 8/2016 | Thangarasa et al. |
| 2021/0185706 | A1* | 6/2021 | Park .................. H04L 27/2607 |

FOREIGN PATENT DOCUMENTS

| | | |
|---|---|---|
| CN | 103069724 A | 4/2013 |
| CN | 105978608 A | 9/2016 |
| CN | 109076551 A | 12/2018 |
| EP | 2587843 A4 | 7/2013 |
| EP | 2975783 A1 | 1/2016 |
| TW | I452924 B | 9/2014 |
| WO | WO-2012051119 A1 | 4/2012 |
| WO | WO-2015168940 A1 | 11/2015 |

OTHER PUBLICATIONS

International Search Report and Written Opinion—PCT/CN2016/101146—ISA/EPO—dated Jul. 6, 2017.
International Search Report and Written Opinion—PCT/CN2017/078005—ISA/EPO—dated Jul. 6, 2017.
Qualcomm Incorporated: "Discussion on Uplink DMRS Enhancements for FD-MIMO", 3GPP TSG-RAN WG1 #86, R1-166271, Aug. 26, 2016, 4 pages.
Supplementary Partial European Search Report—EP17854379—Search Authority—The Hague—dated Apr. 28, 2020 (165564EP).
NEC: "Discussion on IFDMA based Scheme", 3GPP TSG RAN WG1 Meeting #86, R1-166634, Gothenburg, Sweden Aug. 22-26, 2016, 4 Pages.
Samsung: "Proposals on Uplink DMRS Design Enhancements", 3GPP TSG RAN WG1 #86, R1-166742, Gothenburg, Sweden, Aug. 22-26, 2016.
ZTE Corporation, et al., "Discussion on UL DMRS Enhancement for eFD-MIMO", 3GPP TSG RAN WG1 Meeting #86, R1-166326, Gothenburg, Sweden, pp. 1-5, Aug. 22-26, 2016.
Alcatel-Lucent Shanghai Bell., et al., "UL DMRS Configuration for PHICH-triggered Retransmission", 3GPP Draft, 3GPP TSG RAN WG1 Meeting #63, R1-105994, UL DMRS Configuration Final, 3rd Generation Partnership Project (3GPP), Mobile Competence Centre, 650, Route Des Lucioles, F-06921, Sophia-Antipolis Cedex, France, vol. RAN WG1, No. Jacksonville, USA; Nov. 15, 2010-Nov. 19, 2010, Nov. 9, 2010 (Nov. 9, 2010), XP050489498, 3 pages, [retrieved on Nov. 9, 2010] Section 2.
European Search Report—EP21166881—Search Authority—The Hague—dated Sep. 10, 2021.
LG Electronics: "Support for V2V Services Based on LTE Sidelink", RP-161602, 3GPP TSG RAN meeting #73, New Orleans, USA, Sep. 19-22, 2016, Sep. 22, 2016, 20 Pages.
Supplementary European Search Report—EP17854379—Search Authority—The Hague—dated Sep. 10, 2020.

* cited by examiner

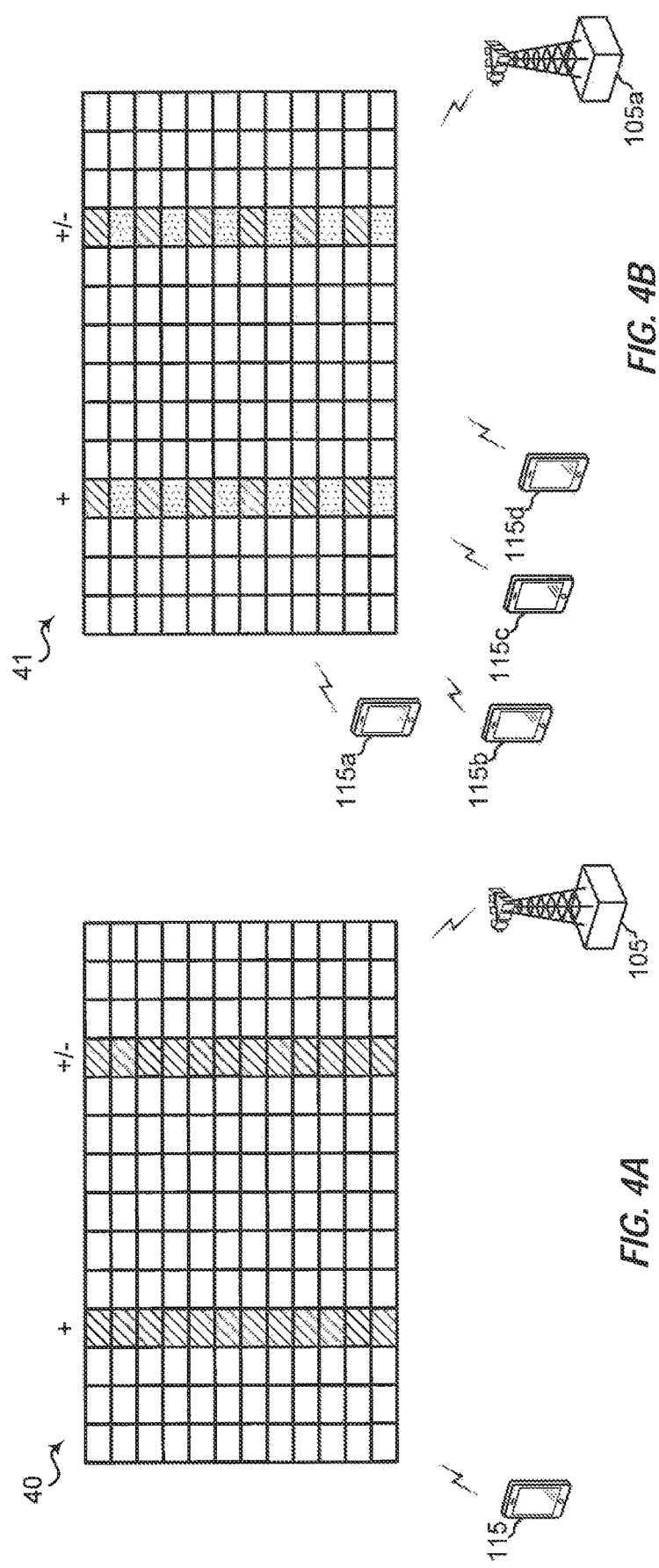

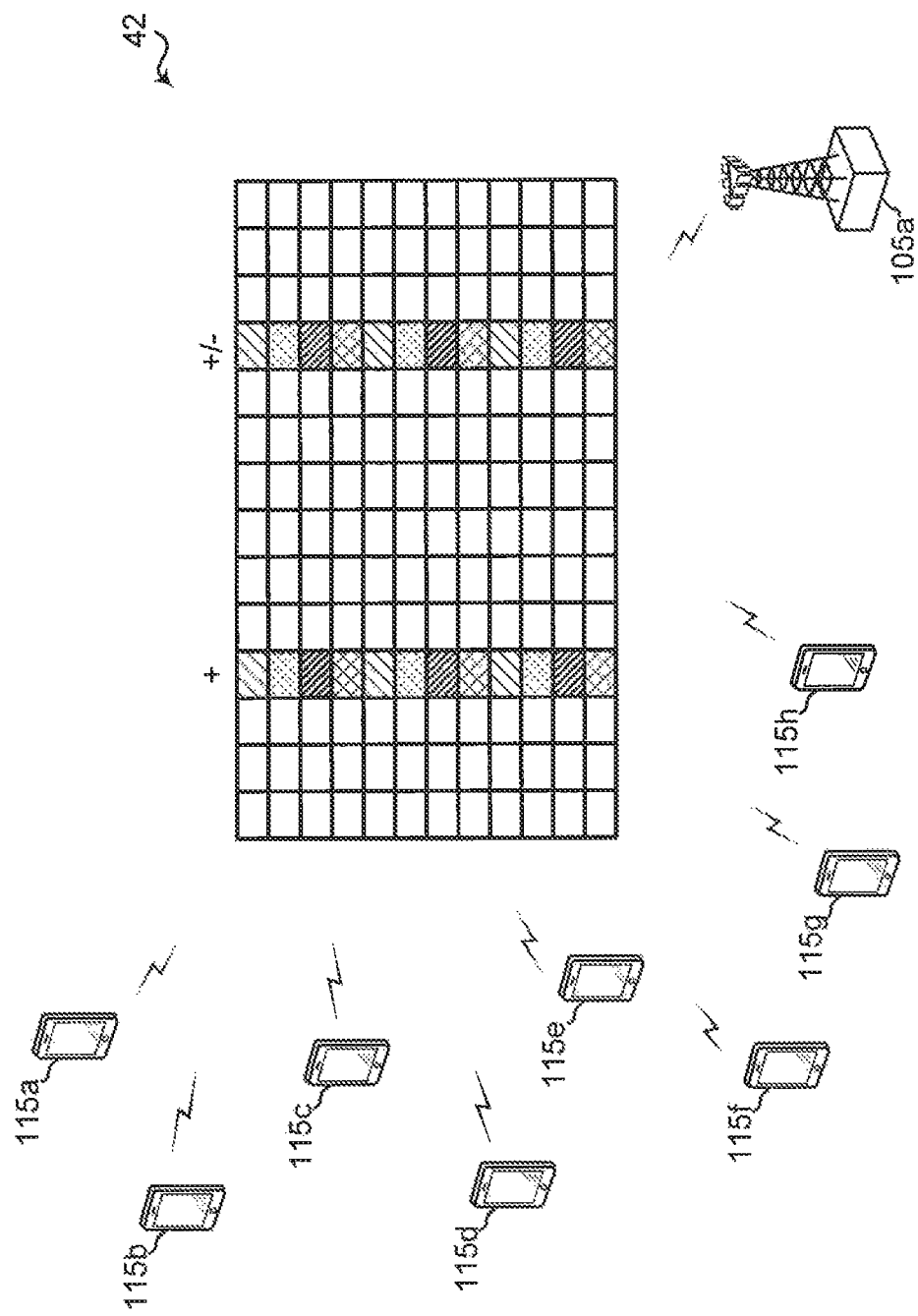

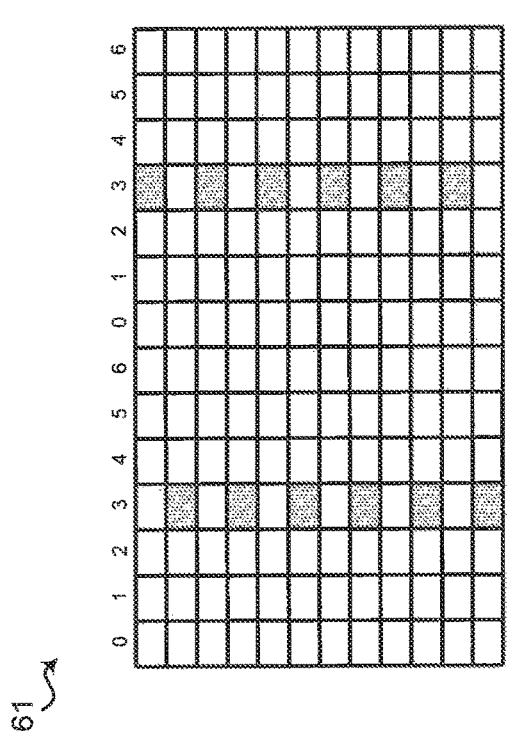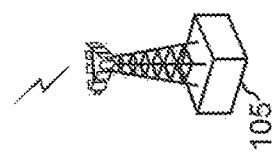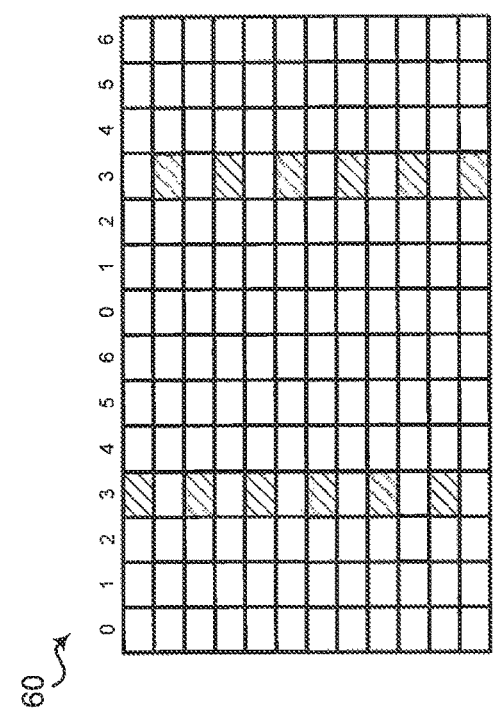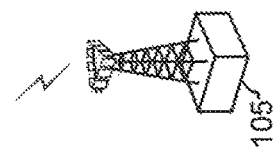
FIG. 6B
FIG. 6A

COMB ADAPTATION FOR INTERLACED FDM DMRS

CROSS-REFERENCE TO RELATED APPLICATIONS

This application claims the benefit of PCT/CN2016/101146, entitled, "COMB ADAPTATION FOR INTERLACED FDM DMRS," filed on Sep. 30, 2016, which is expressly incorporated by reference herein in its entirety.

BACKGROUND

Field

Aspects of the present disclosure relate generally to wireless communication systems, and more particularly, to comb adaptation for interlaced frequency division multiplex (IFDM) demodulation reference signals (DMRS).

Background

Wireless communication networks are widely deployed to provide various communication services such as voice, video, packet data, messaging, broadcast, and the like. These wireless networks may be multiple-access networks capable of supporting multiple users by sharing the available network resources, Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes determining a transmission configuration for demodulation reference signals (DMRS) in a subframe of each of a plurality of served UEs, wherein the transmission configuration includes a combination of at least a cyclic shift, an orthogonal cover code (OCC), and a comb value, and dynamically signaling the transmission configuration to each of the plurality of served. UEs, wherein at least one of the transmission configurations assigns a first comb value for a first slot of the subframe and a second comb value for a second slot of the subframe that is different than the first comb value.

In an additional aspect of the disclosure, a method of wireless communication includes receiving a transmission configuration from a serving base station for transmission of DMRS in a subframe, wherein the transmission configuration includes a combination of at least a cyclic shift, an OCC, and a comb value, determining a transmission comb value by applying a hopping function to the comb value received in the transmission configuration, and transmitting DMRS according to the transmission configuration modified by the transmission comb value.

In an additional aspect of the disclosure, a method of wireless communication includes receiving a transmission configuration from a serving base station for transmission of DMRS in a subframe, wherein the transmission configuration includes a combination of at least a cyclic shift, an OCC, and a comb value, preparing a retransmission of the DMRS, wherein the retransmission is counted by a current transmit counter, selecting a transmission comb value for the retransmission, wherein the transmission comb value is selected based on a current number in the current transmit counter, and wherein the transmission comb value is different than an original comb value used in transmission of the DMRS, and transmitting the retransmission using the transmission comb value.

In an additional aspect of the disclosure, an apparatus configured for wireless communication includes means for determining a transmission configuration for DMRS in a subframe of each of a plurality of served UEs, wherein the transmission configuration includes a combination of at least a cyclic shift, an OCC, and a comb value, and means for dynamically signaling the transmission configuration to each of the plurality of served UEs, wherein at least one of the transmission configurations assigns a first comb value for a first slot of the subframe and a second comb value for a second slot of the subframe that is different than the first comb value.

In an additional aspect of the disclosure, an apparatus configured for wireless communication includes means for receiving a transmission configuration from a serving base station for transmission of DMRS in a subframe, wherein the transmission configuration includes a combination of at least a cyclic shift, an OCC, and a comb value, means for determining a transmission comb value by applying a hopping function to the comb value received in the transmission configuration, and means for transmitting DMRS according to the transmission configuration modified by the transmission comb value.

In an additional aspect of the disclosure, an apparatus configured for wireless communication includes means for receiving a transmission configuration from a serving base station for transmission of DMRS in a subframe, wherein the transmission configuration includes a combination of at least a cyclic shift, an OCC, and a comb value, means for preparing a retransmission of the DMRS, Wherein the retransmission is counted by a current transmit counter, means for selecting a transmission comb value for the retransmission, wherein the transmission comb value is selected based on a current number in the current transmit counter, and wherein the transmission comb value is different than an original comb value used in transmission of the DMRS, and means for transmitting the retransmission using the transmission comb value.

In an additional aspect of the disclosure, a non-transitory computer-readable medium having program code recorded thereon. The program code further includes code to determine a transmission configuration for DMRS in a subframe of each of a plurality of served. UEs, wherein the transmission configuration includes a combination of at least a cyclic shift, an OCC, and a comb value, and code to dynamically signal the transmission configuration to each of the plurality of served UEs, wherein at least one of the transmission configurations assigns a first comb value for a first slot of the subframe and a second comb value for a second slot of the subframe that is different than the first comb value.

In an additional aspect of the disclosure, a non-transitory computer-readable medium having program code recorded thereon. The program code further includes code to receive a transmission configuration from a serving base station for transmission of DMRS in a subframe, wherein the transmission configuration includes a combination of at least a cyclic shift, an OCC, and a comb value, code to determine a transmission comb value by applying a hopping function to the comb value received in the transmission configuration, and code to transmit DMRS according to the transmission configuration modified by the transmission comb value.

In an additional aspect of the disclosure, a non-transitory computer-readable medium having program code recorded thereon. The program code further includes code to receive a transmission configuration from a serving base station for transmission of DMRS in a subframe, wherein the transmission configuration includes a combination of at least a cyclic shift, an OCC, and a comb value, code to prepare a retransmission of the DMRS, wherein the retransmission is counted by a current transmit counter, code to select a transmission comb value for the retransmission, wherein the transmission comb value is selected based on a current number in the current transmit counter, and wherein the transmission comb value is different than an original comb value used in transmission of the DMRS, and code to transmit the retransmission using the transmission comb value.

In an additional aspect of the disclosure, an apparatus configured for wireless communication is disclosed. The apparatus includes at least one processor, and a memory coupled to the processor. The processor is configured to determine a transmission configuration for DMRS in a subframe of each of a plurality of served UEs, wherein the transmission configuration includes a combination of at least a cyclic shift, an OCC, and a comb value, and to dynamically signal the transmission configuration to each of the plurality of served UEs, wherein at least one of the transmission configurations assigns a first comb value for a first slot of the subframe and a second comb value for a second slot of the subframe that is different than the first comb value.

In an additional aspect of the disclosure, an apparatus configured for wireless communication is disclosed. The apparatus includes at least one processor, and a memory, coupled to the processor. The processor is configured to receive a transmission configuration from a serving base station for transmission of DMRS in a subframe, wherein the transmission configuration includes a combination of at least a cyclic shift, an OCC, and a comb value, to determine a transmission comb value by applying a hopping function to the comb value received in the transmission configuration, and to transmit DMRS according to the transmission configuration modified by the transmission comb value.

In an additional aspect of the disclosure, an apparatus configured for wireless communication is disclosed. The apparatus includes at least one processor, and a memory coupled to the processor. The processor is configured to receive a transmission configuration from a serving base station for transmission of DMRS in a subframe, wherein the transmission configuration includes a combination of at least a cyclic shift, an OCC, and a comb value, to prepare a retransmission of the DMRS, wherein the retransmission is counted by a current transmit counter, to select a transmission comb value for the retransmission, wherein the transmission comb value is selected based on a current number in the current transmit counter, and wherein the transmission comb value is different than an original comb value used in transmission of the DMRS, and to transmit the retransmission using the transmission comb value.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 4A-4C are block diagrams illustrating a subframe communicated between a UE and a base station.

FIGS. 6A-6B are block diagrams illustrating a subframe communicated between a UE and a base station.

DETAILED DESCRIPTION

Figure 1:
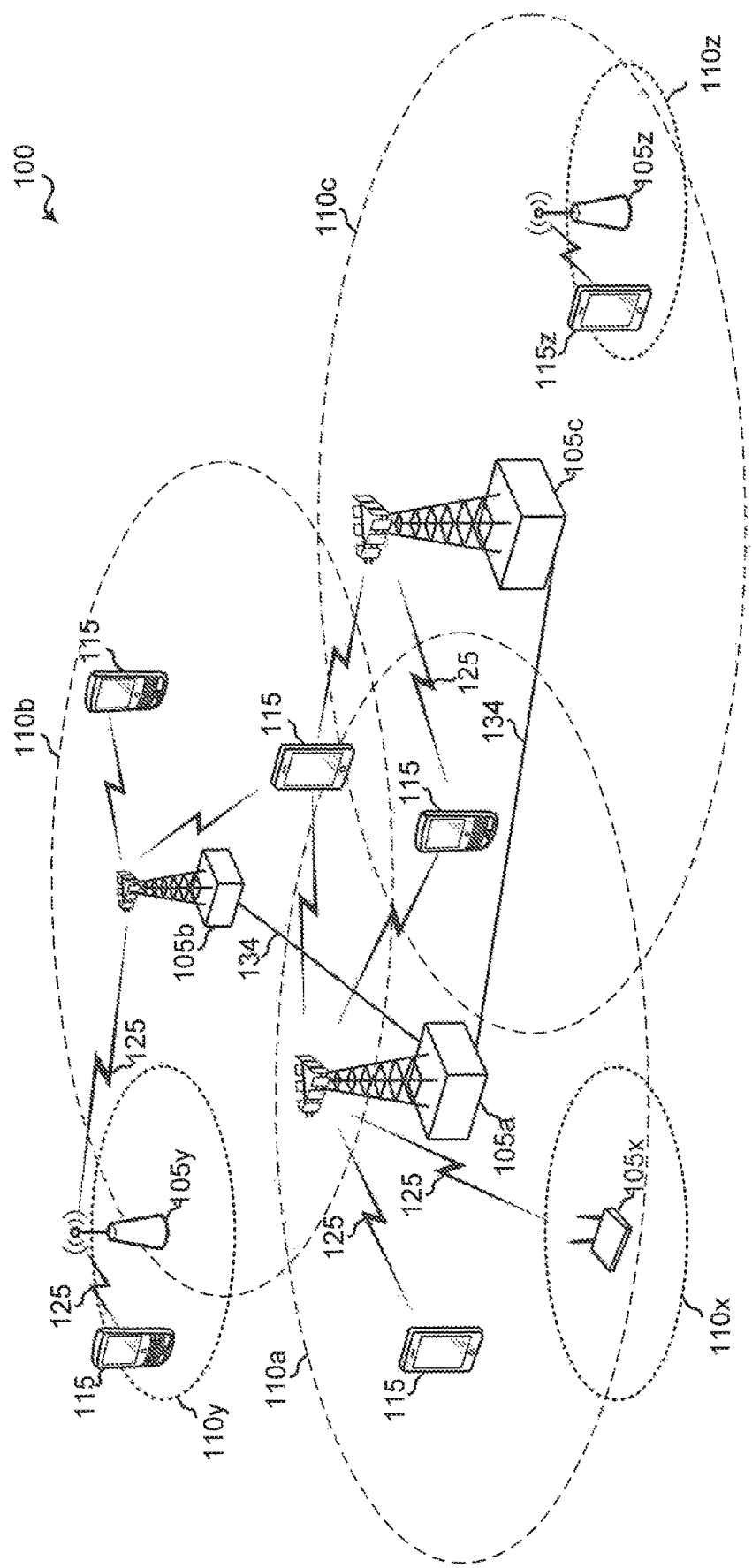
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA), cdma2000, and the like. UTRA, includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including in unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation), The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows a wireless network 100 for communication, which may be an LTE-A network. The wireless network 100 includes a number of evolved node Bs (eNBs) 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell, A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105a, 105b and 105c are macro eNBs for the macro cells 110a, 110b and 110c, respectively. The eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pica eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Wired backhaul communication 134 indicate wired backhaul communications that may occur between eNBs.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (X) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (X) may be dependent on the system bandwidth. For example, X may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
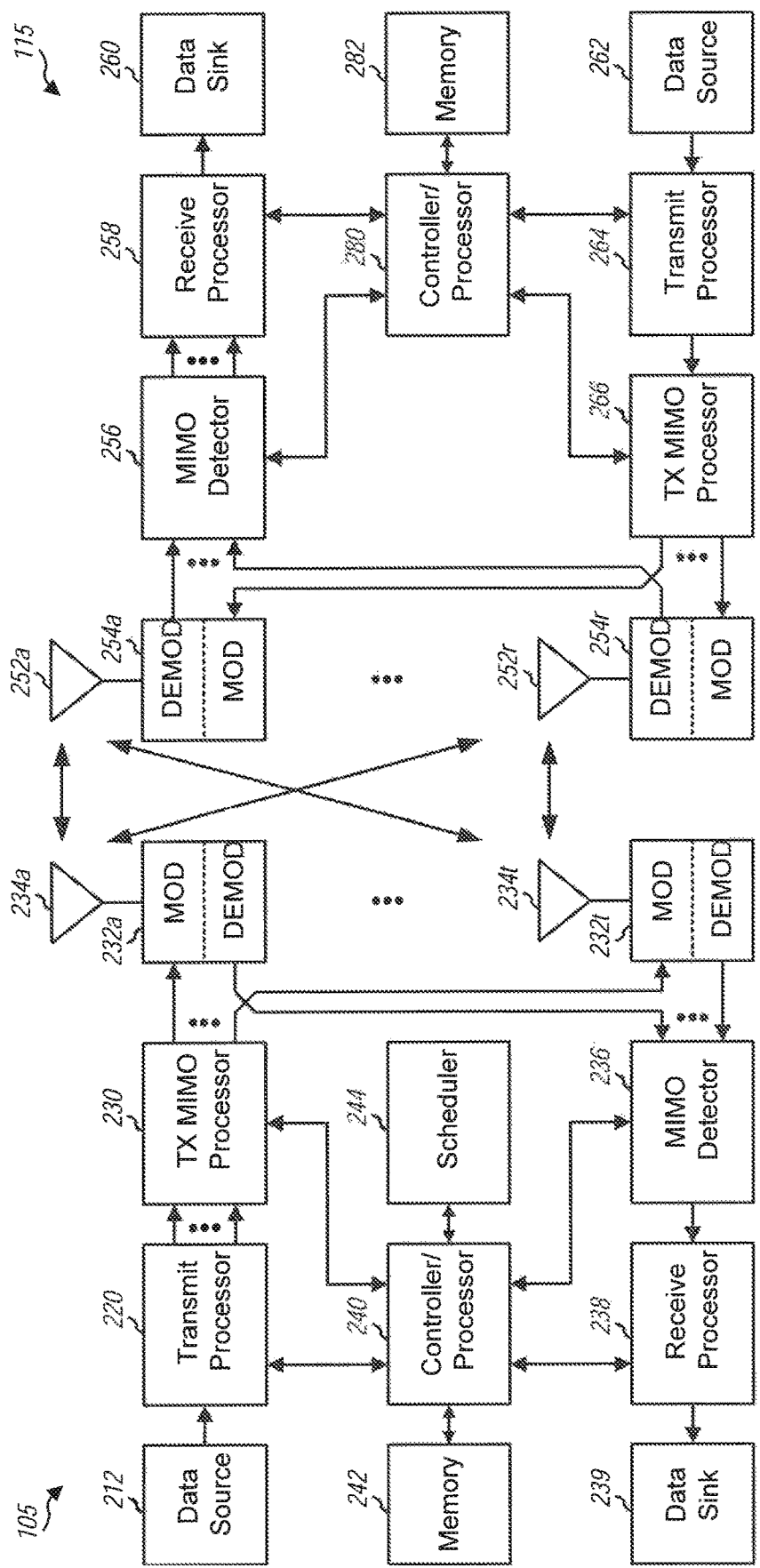
FIG. 2 is a block diagram conceptually illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. For a restricted association scenario, the eNB 105 may be the small cell eNB 105z in FIG. 1, and the UE 115 may be the UE 115z, which in order to access small cell eNB 105z, would be included in a list of accessible UEs for small cell eNB 105z. The eNB 105 may also be a base station of some other type. The eNB 105 may be equipped with antennas 234a through 234t, and the UE 115 may be equipped with antennas 252a through 252r.

At the eNB 105, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., preceding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIGS. 5, 7, and 8, and/or other processes for the techniques described herein. The memories 242 and 282 may store data and program codes for the eNB 105 and the UE 115, respectively. A scheduler 244 may schedule UEs for data transmission on the downlink and/or uplink.

Multiple-input multiple-output (MIMO) technology is a communication technology that has been added to the LTE specifications in order to improve the performance of the system. This technology provides LTE with the ability to further improve its data throughput and spectral efficiency above that obtained by the use of OFDM. The basic concept of MIMO uses the multipath signal propagation that is present in terrestrial communications. Rather than providing interference, these paths can be used to advantage. The transmitter and receiver typically have more than one antenna and, using the processing power available at either end of the link, are able to use the different paths between the two entities to provide improvements in the data rate of signal to noise.

MIMO communication systems may be provisioned as single-user MIMO (SU-MIMO) or multi-user MIMO (MU-MIMO). In SU-MIMO systems, the eNB communicates with only one UE at any given time. In contrast, the eNB in a MU-MIMO system is able to communicate with multiple UEs at once. SU-MIMO and MU-MIMO systems are two possible configurations for multi-user communication systems. These systems may be able to achieve the overall multiplexing gain obtained as the minimum value between the number of antennas at base stations and the number of antennas at users. The fact that multiple users may simultaneously communicate over the same spectrum improves the system performance. Nevertheless, MU-MIMO networks are exposed to strong co-channel interference which is not the case for SU-MIMO networks. MU-MIMO systems address such interference using various interference management techniques including techniques based on beamforming. The beamforming of MU-MIMO systems benefits from channel state information (CSI) feedback of the serviced UEs.

An eNB may broadcast cell-specific CSI reference signals (CSI-RS) for which the UE measures CSI based on configurations signaled by eNB via RRC, such as CSI-RS resource configuration and transmission mode. The CSI-RS are periodically transmitted at periodicities of 5, 10, 20, 40, 80 ms, or the like. A UE may report CSI at CSI reporting instances also configured by the eNB. As a part of CSI reporting the UE generates and reports channel quality indicator (CQI), preceding matrix indicator (PMI), and rank indicator (RI). The CSI can be reported either via PUCCH or via PUSCH and may be reported either periodically or aperiodically, with potentially different granularity. When reported via PUCCH, the payload size for CSI may be limited.

MU-MIMO systems may be implemented with eNBs configured with lower-order antennas arrays (e.g., $N_T \leq 8$) or with higher-order or "massive" antennas arrays (e.g., $N_T \geq 8$), where $N_T$ represents the number of transmit antennas of the eNB, In order to increase system capacity, full-dimensional (FD)-MIMO technology has been considered, in which an eNB uses a two-dimensional (2D) active antenna array with a large number of antennas with antenna ports having both horizontal and vertical axes, and has a larger number of transceiver units. For conventional MEMO systems, beamforming has typically implemented using only azimuth dimension, although of a 3D multi-path propagation. However, for FD-MIMO each transceiver unit has its own independent amplitude and phase control. Such capability together with the 2D active antenna array allows the transmitted signal to be steered not only in the horizontal direction, as in conventional multi-antenna systems, but also simultaneously in both the horizontal and the vertical direction, which provides more flexibility in shaping beam directions from an eNB to a UE. Providing dynamic beam steering in the vertical direction has been shown to result in significant gain in interference avoidance. Thus, FD-MIMO technologies may take advantage of both azimuth and elevation beamforming, which would greatly improve MIMO system capacity and signal quality.

Figure 3:
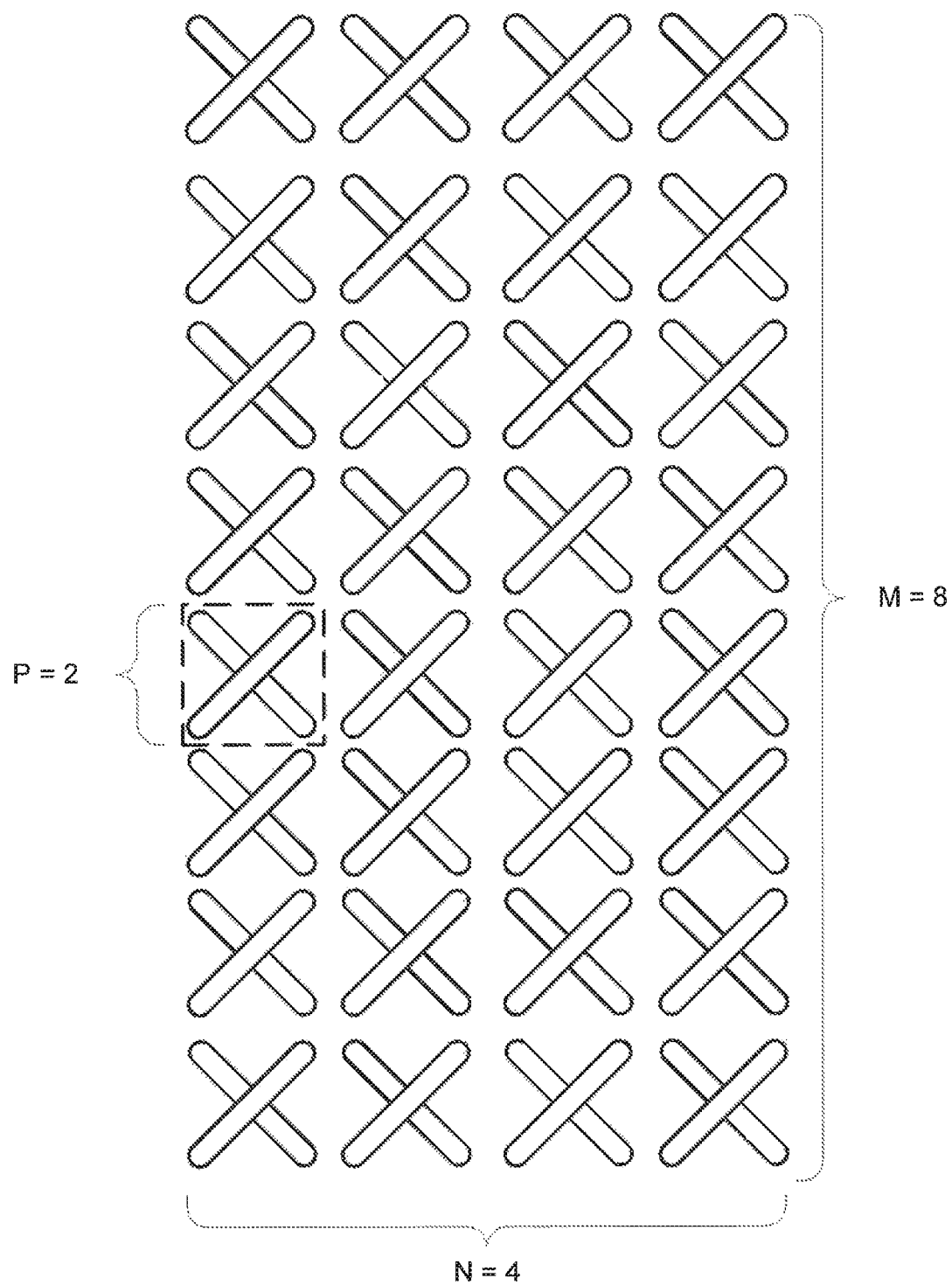
FIG. 3 is a block diagram illustrating a typical 2D active antenna array.

FIG. 3 is a block diagram illustrating a typical 2D active antenna array 30, Active antenna array 30 is a 64-transmitter, cross-polarized uniform planar antenna array comprising four columns, in which each column includes eight cross-polarized vertical antenna elements. Active antenna array's are often described according to the number of antenna columns (N), the polarization type (P), and the number of vertical elements having the same polarization type in one column (M). Thus, active antenna array 30 has four columns (N=4), with eight vertical (M=8) cross-polarized antenna elements (P=2). For a 2D array structure, in order to exploit the vertical dimension by elevation beamforming the CSI is used at the base station. The CSI, in terms of PMI, RI, and CQI, can be fed back to the base station by a mobile station based on downlink channel estimation and predefined PMI codebook(s).

In current LTE systems, uplink demodulation reference signals (DMRS) are generally time multiplexed with the PUSCH data symbols occupying the same bandwidth. Uplink DMRS may be transmitted on one SC-FDMA symbol per slot, Thus, two DMRS symbols may be transmitted per subframe. A combined cyclic shift (CS) and time domain orthogonal cover code (OCC) may then be used to separate the DMRS for different UEs participating in MU-MIMO operation. UEs transmitting on the same set of subcarriers can use different cyclic shifts of the same base sequence to provide orthogonal DMRS multiplexing. In the case of unequal bandwidth allocation, UEs can be assigned with different OCCs for time domain spreading to maintain DMRS port orthogonality, e.g., OCC=[1 1] for one UE and OCC=[1 -1] for another UE to spread two DMRS symbols in the subframe.

There is a need to increase DMRS port orthogonality for higher order MU-MIMO in uplink when massive antennas are deployed at eNBs. For example, supporting more than two UEs with partially overlapping bandwidth allocations. Interleaved frequency division multiplex (FDM) or comb based DMRS has been proposed for wireless technologies in Rel-14. In such proposed systems, different users' DMRS transmissions using different comb values or occupying interleaved sets of subcarriers can still remain orthogonal, With a comb number of 2 and 4, up to 4 and 8 UEs with partially overlapping bandwidth allocations can be supported by combining with time domain OCCs.

FIG. 4A is a block diagram illustrating a subframe 40 communicated between UE 115 and base station 105. The two shaded SC-TDMA symbols within subframe 40 represent the DMRS symbols transmitted by UE 115.

FIG. 4B is a block diagram illustrating a subframe 41 communicated between UEs 115a-115d and a base station 105a. With the deployment of higher order antenna arrays at eNBs, such as massive MEMO at base station 105a, an increase of DMRS port orthogonality for higher order MU-MIMO in uplink communications may be beneficial. A combined cyclic shift and time domain OCC are used to separate the DMRS for different UEs, such as UEs 115a-115d, participating in the multi-user MIMO (MU-MIMO) operation. For example, different users' DMRS transmission using a different comb value or occupying interleaved sets of subcarriers may remain orthogonal.

With a comb value number of 2 and 4, up to 4 and 8 UEs, respectively, with partially overlapping bandwidth allocations can be supported by combining with a time domain OCC. For example, as illustrated in FIG. 4B UEs 115a-115d may be accommodated using a comb number of 2. The DMRS of UEs 115a-115b and UEs 115c-115d are represented by the different shading in the two SC-FDMA symbols of subframe 41 holding DMRS transmissions. The multiplexed DMRS of UEs 115a-115b may be assigned with different OCC for time domain spreading to maintain port orthogonality (e.g., OCC=[1 1] for UE 115a and OCC=[1 -1] for UE 115b for spreading two DMRS symbols in subframe. However, one issue that may arise with IFDM DMRS is its application to small RB allocation, since the length of a DMRS sequence is generally divided by the comb number and the sequence orthogonality cannot typically be maintained for a reduced DMRS sequence. Another issue that may arise is that a new DMRS sequence design may be useful for IFDM DMRS, since the DMRS sequence length can be 9, 15, 18, 24, 27, 30 for some configurations of comb number and RB assignment, which are not currently supported.

FIG. 4C is a block diagram illustrating a subframe 42 communicated between UEs 115a-115h and base station 105a. The eight UEs with partially overlapping bandwidth allocations, UEs 115a-115h, may be accommodated using a combination of the comb value number of 4 and a time domain OCC. The DMRS of UEs 115a-115h are separated in the SC-FDMA symbols using combined cyclic shift and time domain OCC, such that four of the UEs multiplex DMRS in the SC-FDMA symbol of the first slot and the other four UEs multiplex DMRS in the SC-FDMA symbol of the second slot.

While current use of the same comb value for two DMRS symbols in one subframe may not be optimal for DMRS interference randomization, various aspects of the present disclosure are directed to allowing different comb values to be assigned for two slots in the same subframe. Therefore, the combinations of cyclic shift, OCC, and comb value for the two DMRS symbols in the subframe can be assigned with either same or different comb values for IFDMA DMRS. For example, the assignment may dynamically indicate one of four possible comb combinations, e.g., [0 0], [1 1], [0 1], and [1 0], through the uplink grant for IFDMA DMRS with a comb value of 2. It may also be possible to have a joint coding table among OCC, cyclic shift, and comb value by reusing the existing 3-bit cyclic shift field (CSF) in the uplink grant. Thus, for each CSF in the set {000, 001, 010, 111}, the OCC of layers 1 and 2 may be different from that of layers 3 and 4, and a different comb value may be used for the two slots. Moreover, for each CSF option in the set {011, 100, 101, 110}, the OCC of layers 1 to 4 may be the same, while the same comb values can also be used for two slots. With each of the two CSF subsets above, different combs may be mapped to the CSF with the same OCC. That is, the comb values of CSF options {000} and {111} may be different while the OCC of layers 1 and 2 is same for the two CSF options. Similarly, different comb values may be used for CSF options {011} and {100}, which use the same OCC from layers 1 to 4.

Figure 5:
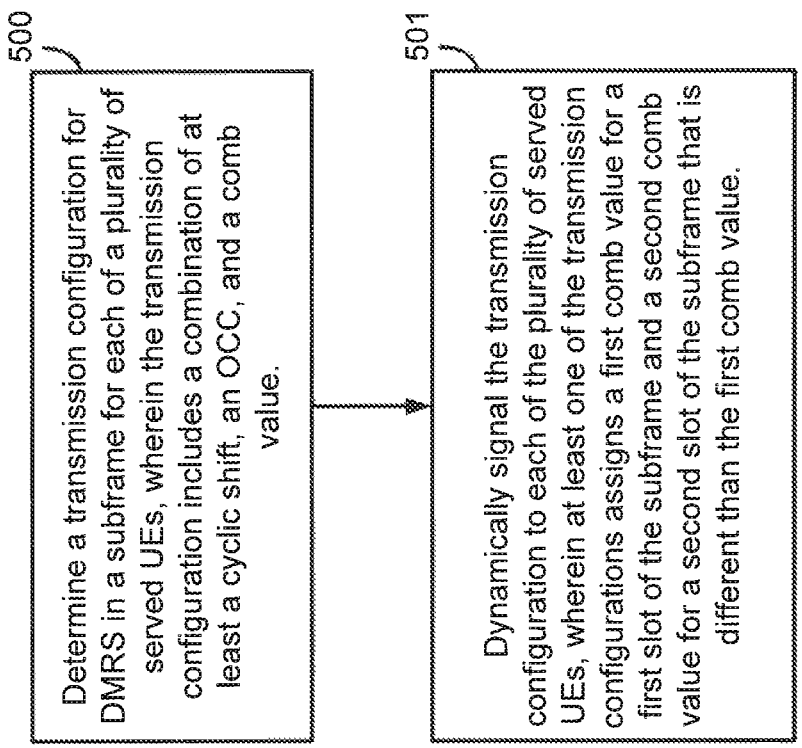
FIG. 5 is a block diagram illustrating example blocks executed to implement one aspect of the present disclosure.
Figure 9:
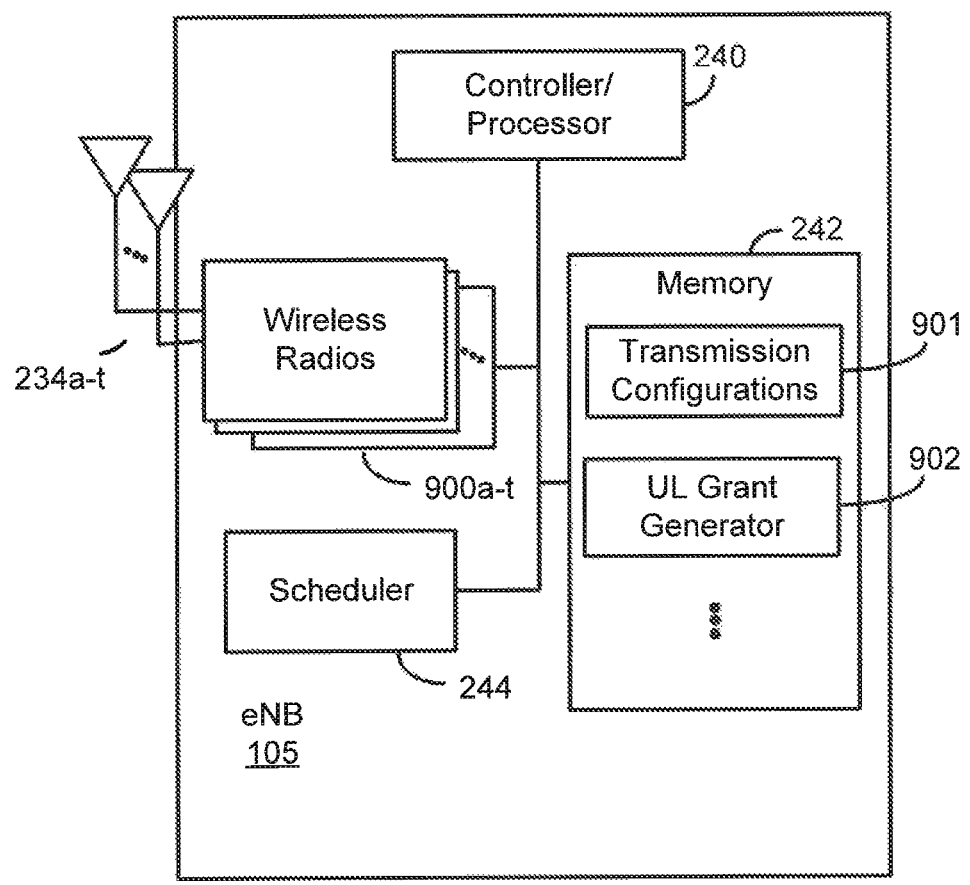
FIG. 9 is a block diagram illustrating an example eNB configured according to one aspect of the present disclosure.

FIG. 5 is a block diagram illustrating example blocks executed to implement one aspect of the present disclosure. The example blocks will also be described with respect to eNB 105 as illustrated in FIG. 9. FIG. 9 is a block diagram illustrating eNB 105 configured according to one aspect of the present disclosure. eNB 105 includes the structure, hardware, and components as illustrated for eNB 105 of FIG. 2. For example, eNB 105 includes controller/processor 240, which operates to execute logic or computer instructions stored in memory 242, as well as controlling the components of eNB 105 that provide the features and functionality of eNB 105. eNB 105, under control of controller/processor 240, transmits and receives signals via wireless radios 900a-t and antennas 234a-t. Wireless radios 900a-t includes various components and hardware, as illustrated in FIG. 2 for eNB 105, including modulator/demodulators 232a-t, MIMO detector 236, receive processor 238, transmit processor 220, and TX MIMO processor 230.

At block 500, an eNB determines a transmission configuration for MARS in a subframe for each of a plurality of served UEs, wherein the transmission configuration includes a combination of at least a cyclic shift, an OCC, and a comb value. For example, eNB 105, under control of controller/processor 240, accesses transmission configurations 901, stored in memory 242, to determine which combination of cyclic shift, OCC, and comb value to assign. eNB 105 may then select the appropriate transmission configuration, which may include the CSF option for assignment to a particular served UE.

At block 501, the eNB dynamically signals the transmission configuration to each of the plurality of served UEs, wherein at least one of the transmission configurations assigns a first comb value for a first slot of the subframe and a second comb value for a second slot of the subframe that is different than the first comb value. For example, eNB 105, under control of controller/processor 240, operates scheduler 244 along with uplink grant generator logic 902, stored in memory 242, to generate an uplink grant for the served UEs which include the selected transmission configuration. Some of the CSF options selected for the transmission configuration of the uplink grant allow for a different comb value for each slot in the subframe. eNB 105 may dynamically signal the assigned CSF option via uplink grant using wireless radios 900a-4 and antennas 234a-t.

Table I below identifies examples of the cyclic shift/OCC/comb mapping table design for a comb value of 2.

TABLE 1

| CS Field in UL DCI format | Comb Valuses for two slots (Comb = 2) | $n^{(2)}_{DMRS,\lambda}$ | | | | $[w^{(\lambda)}(0)\ w^{(\lambda)}(1)]$ | | | |
|---|---|---|---|---|---|---|---|---|---|
| | | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 000 | [0 1] | 0 | 6 | 3 | 9 | [1 1] | [1 1] | [1 −1] | [1 −1] |
| 001 | [0 1] | 6 | 0 | 9 | 3 | [1 −1] | [1 −1] | [1 1] | [1 1] |
| 010 | [1 0] | 3 | 9 | 6 | 0 | [1 −1] | [1 −1] | [1 1] | [1 1] |
| 011 | [0 0] | 4 | 10 | 7 | 1 | [1 1] | [1 1] | [1 1] | [1 1] |
| 100 | [1 1] | 2 | 8 | 5 | 11 | [1 1] | [1 1] | [1 1] | [1 1] |
| 101 | [0 0] | 8 | 2 | 11 | 5 | [1 −1] | [1 −1] | [1 −1] | [1 −1] |
| 110 | [1 1] | 10 | 4 | 1 | 7 | [1 −1] | [1 −1] | [1 −1] | [1 −1] |
| 111 | [1 0] | 9 | 3 | 0 | 6 | [1 1] | [1 1] | [1 −1] | [1 −1] |

FIGS. 6A and 6B are block diagrams illustrating subframes 60 and 61 communicated between UE 115 and eNB 105 configured according to one aspect of the present disclosure. When eNB 105 determines the transmission configuration for uplink DMRS of UE 115, it may select CSF options {000, 001, 010, 111}, which include assignment of different comb values for each SC-FDMA symbol of the two slots. Subframe 60 illustrates a comb value assignment [0 1] (CSF options {000, 001}), while subframe 61 illustrates a comb value assignment [1 0] (CSF options {010, 111}). The different comb values provides for different subcarriers for the DMRS transmissions, which may increase the interference randomization within the subframe.

For achieving further interference randomization, additional aspects of the present disclosure provide for inter-subframe comb hopping. For example, the comb value used for DMRS may be determined according to a predefined function. In one example implementation, such inter-subframe comb hopping may be determined according to the following function.

$$n_{comb}(n_s) = \mathrm{mod}(n_{comb,DMRS}(\mathrm{mod}(n_s/2)) + f(n_s/2), \quad (1)$$

Where $n_s$ represents the subframe index and $n_{comb}$, DMRS represents the comb value given by the CSF in the uplink grant. The comb-shift pattern f(i) may be determined based on the subframe index and cell identifier (ID), while $K_{TC}$ is the number of combs configured for IFDMA DMRS, e.g., $K_{TC}=2$ or 4. The inter-subframe comb-shift hopping may be configured by RRC signaling. Similarly, inter-RB comb-shift hopping can also be configured and in such case different combs can be assigned to different RBs according to a pseudo-random pattern.

Figure 7:
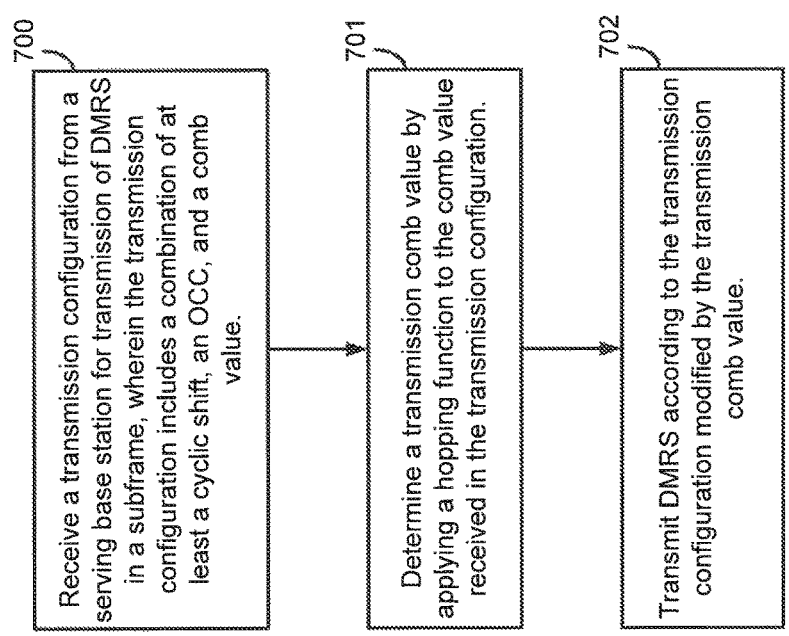
FIG. 7 is a block diagram illustrating example blocks executed to implement one aspect of the present disclosure.
Figure 10:
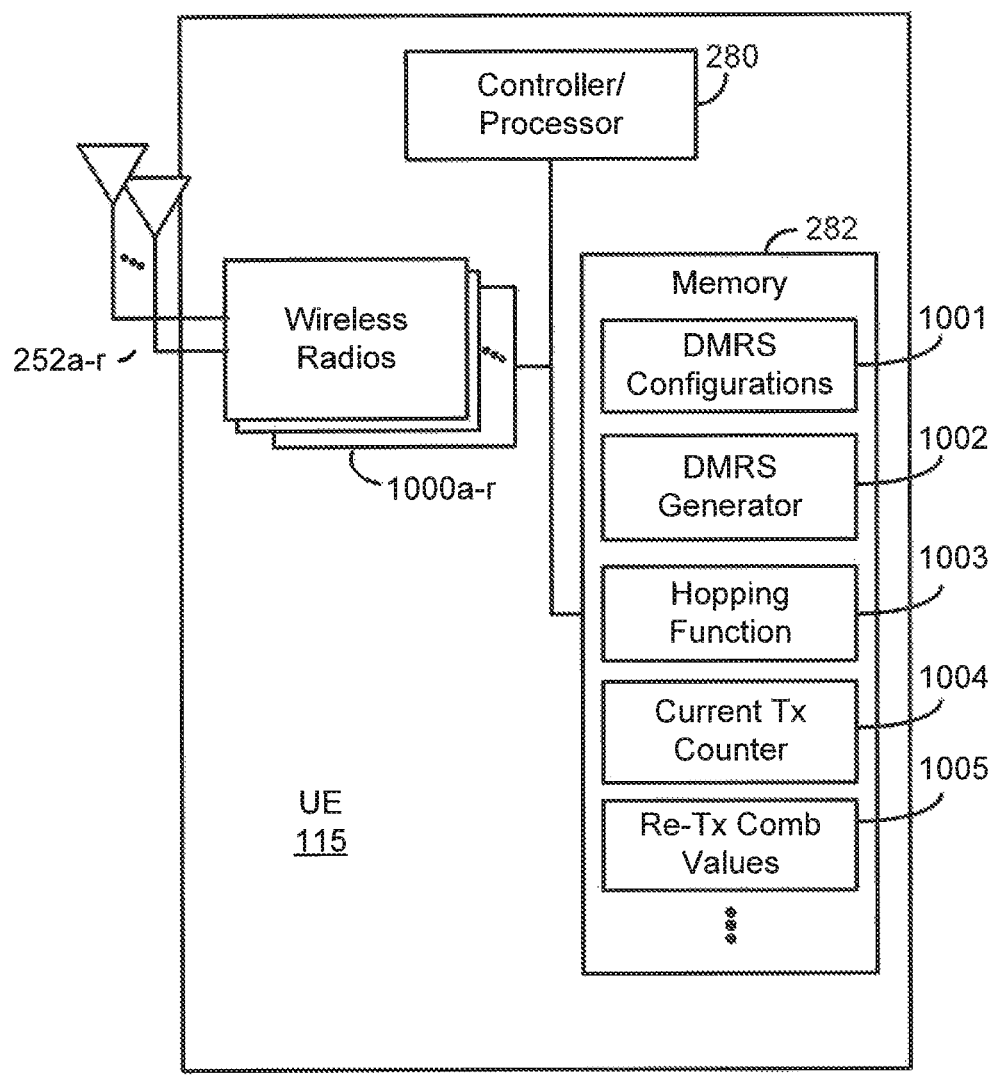
FIG. 10 is a block diagram illustrating an example UE configured according to one aspect of the present disclosure.

FIG. 7 is a block diagram illustrating example blocks executed to implement one aspect of the present disclosure. The example blocks will also be described with respect to UE 115 as illustrated in FIG. 10. FIG. 10 is a block diagram illustrating UE 115 configured according to one aspect of the present disclosure. UE 115 includes the structure, hardware, and components as illustrated for UE 115 of FIG. 2, For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1000a-r and antennas 252a-r. Wireless radios 1000a-r includes various components and hardware, as illustrated in FIG. 2 for UE 115, including modulator/demodulators 254*a-r*, MIMO detector 256, receive processor 258, transmit processor 264, and TX MIMO processor 266.

At block 700, a UE receives a transmission configuration from a serving base station for transmission of DMRS in a subframe, wherein the transmission configuration includes a combination of at least a cyclic shift, an OCC, and a comb value. For example, UE 115 may receive a CSF option within an uplink grant for DMRS transmissions with a subframe via antennas 252*a*-4 and wireless radios 1000*a*-4. The transmission configuration may then be stored at DMRS configurations 1001 in memory 282, which includes the specific combination of cyclic shift, OCC, and comb value assigned by the serving base station.

At block 701, the UE determines a transmission comb value by applying a hopping function to the comb value received in the transmission configuration. For example, UE 115, under control of controller/processor 280, executes hopping function 1003, stored in memory 282, which applies the hopping function to the comb value received in the transmission configuration. Hopping function 1003 may be a random or pseudo-random hopping function applied to the comb value received in the transmission configuration received through the CST option.

At block 702, the UE may then transmit DMRS according to the transmission configuration modified by the transmission comb value. For example, UE 115, under control of controller processor 280, executes DMRS generator 1002 which, through the cyclic shift and OCC values stored in DMRS configurations 1001, and the modified comb value resulting from applying hopping function 1003, may transmit the DMRS via wireless radios 1000*a-r* and antennas 252*a-r*.

In additional aspects of the present disclosure, for PUSCH transmissions without an uplink grant, such as HARQ re-transmissions, the comb value can be different from the first transmission to the re-transmission. For example, based on the value of the counter maintaining the index of the current transmission or re-transmission (current transmission counter), the counter counts the number of PUSCH transmissions. The UE would receive configuration for this comb-shift hopping, such as through RRC signaling. The configuration received by provide for the comb shifting to occur on a subframe-by-subframe basis or on an RB-by-RB basis. Using the comb shifting function, the comb may be determined by assigning a different comb for odd and even in the current transmission counter, e.g., adaptation between [0 0] and [1 1] if the same comb is used for two slots during the first transmission or between [0 1] and [1 0] in case of different comb used for two slots for the first transmission. The resulting benefits would be to implement inter-cell interference randomization as long as two UEs do not start $1^{st}$ UL transmission at the same time.

Figure 8:
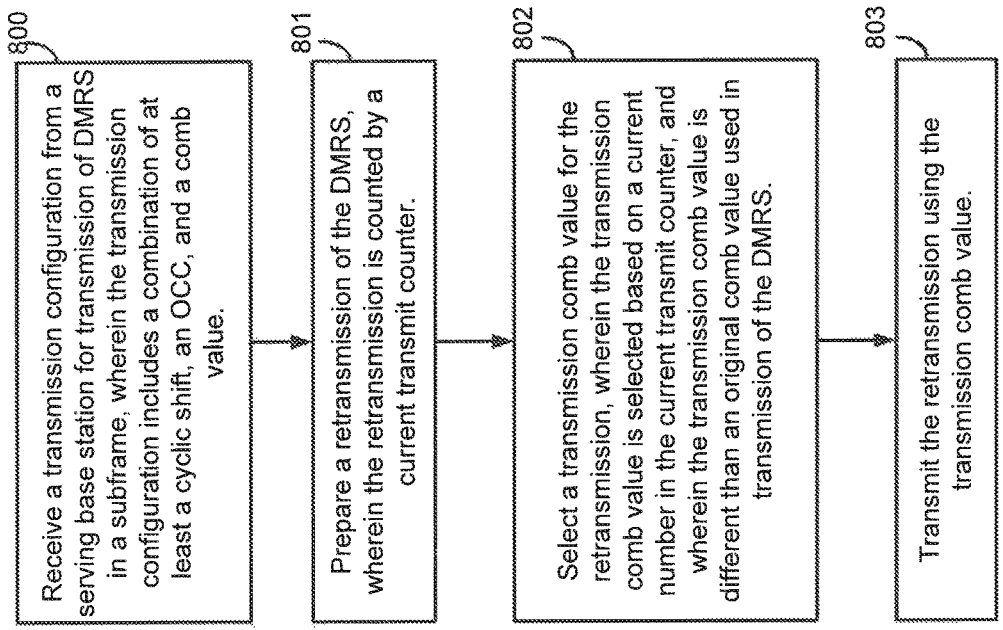
FIG. 8 is a block diagram illustrating example blocks executed to implement one aspect of the present disclosure.

FIG. 8 is a block diagram illustrating example blocks executed to implement one aspect of the present disclosure. The example blocks will also be described with respect to UE 115 as illustrated in FIG. 10. FIG. 10 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE. 115 that provide the features and functionality of UE 115. UE 115, under control of controller/processor 280, transmits and receives signals via wireless radios 1000*a-r* and antennas 252*a-r*. Wireless radios 1000*a-r* includes various components and hardware, as illustrated in FIG. 2 for UE 115, including modulator/demodulators 254*a-r*, MIMO detector 256, receive processor 258, transmit processor 264, and TX MIMO processor 266.

At block 800, a UE receives a transmission configuration from a serving base station for transmission of DMRS in a subframe, wherein the transmission configuration includes a combination of at least a cyclic shift, an OCC, and a comb value. For example, UE 115 may receive a CSF option within an uplink grant for DMRS transmissions with a subframe via antennas 252*a*-4 and wireless radios 1000*a*-4. The transmission configuration may then be stored at DMRS configurations 1001 in memory 282, which includes the specific combination of cyclic shift, OCC, and comb value assigned by the serving base station.

At block 801, the UE prepares a retransmission of the DMRS, wherein the retransmission is counted by a current transmit counter. UE 115 executes DIVERS generator 1002, in memory 282, when it receives an indication to retransmit. The indication also triggers incrementing the counter maintained at current transmission counter 1004, in memory 282.

At block 802, the UE selects a transmission comb value for the retransmission, wherein the transmission comb value is selected based on a current number in the current transmit counter, and wherein the transmission comb value is different than an original comb value used in transmission of the DMRS. For example, within the execution environment of DIVERS generator 1002, when generating a retransmission, LIE 115, under control of controller/processor 280, accesses retransmit comb values 1005, stored in memory 282, to determine which comb values to use in the retransmitted DMRS. When retransmitting, the comb value selected from retransmit comb values DMRS may correspond to the value of current transmit counter 1004 and may be a different comb value than the comb value used with the original DMRS transmission.

At block 803, the UE transmits the retransmission using the transmission comb value. UE 115 may then retransmit the DMRS via wireless radios 1000*a-r* and antennas 252*a-r*.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The present disclosure comprises a first aspect, such as a non-transitory computer-readable medium having program code recorded thereon, the program code comprising:

program code executable by a computer for causing the computer to determine a transmission configuration for demodulation reference signals (DMRS) in a subframe of each of a plurality of served user equipments (UEs), wherein the transmission configuration includes a combination of at least a cyclic shift, an orthogonal cover code (OCC), and a comb value; and program code executable by the computer for causing the computer to dynamically signal the transmission configuration to each of the plurality of served UEs, wherein at least one of the transmission configurations assigns a first comb value for a first slot of the subframe and a second comb value for a second slot of the subframe that is different than the first comb value.

Based on the first aspect, the non-transitory computer-readable medium of a second aspect, wherein the program code executable by the computer for causing the computer to dynamic signal includes:

program code executable by the computer for causing the computer to dynamically transmit the transmission configuration in an uplink grant to each of the plurality of UEs.

Based on the second aspect, the non-transitory computer-readable medium of a third aspect, wherein the transmission configuration is signaled via a joint coding of the cyclic shift, the OCC, and the comb value.

Based on the third aspect, the non-transitory computer-readable medium of a fourth aspect, wherein the at least one of the transmission configuration assigning the first comb value for the first slot and the second comb value for the second slot includes assignment of a different OCC for layer 1 to 4.

Based on the fourth aspect, the non-transitory computer-readable medium of a fifth aspect, wherein another transmission configuration assigning a same comb value to the first and second slot includes assignment of a same OCC for layer 1 to 4.

A sixth aspect of the non-transitory computer-readable medium of any combination of the first through fifth aspects.

The present disclosure comprises a seventh aspect, such as a non-transitory computer-readable medium having program code recorded thereon, the program code comprising:

program code executable by a computer for causing the computer to receiving a transmission configuration from a serving base station for transmission of demodulation reference signals (DMRS) in a subframe, wherein the transmission configuration includes a combination of at least a cyclic shift, an orthogonal cover code (OCC), and a comb value;

program code executable by the computer for causing the computer to determine a transmission comb value by applying a hopping function to the comb value received in the transmission configuration; and program code executable by the computer for causing the computer to transmit DMRS according to the transmission configuration modified by the transmission comb value.

Based on the seventh aspect, the non-transitory computer-readable medium of an eighth, aspect, wherein the hopping function is a pseudo-random function based at least in part on a subframe index, cell identifier (ID), and a number of comb configured for DMRS transmission.

Based on the seventh aspect, the non-transitory computer-readable medium of a ninth aspect, wherein the hopping function is received via a radio resource control (RRC) signal from the serving base station.

The present disclosure comprises a seventh aspect, such as a, wherein the hopping function is configured to assign different comb values to different ones of: resource blocks (RBs) or subframes.

An eleventh aspect of the non-transitory computer-readable medium of any combination of the seventh through tenth aspects.

The present disclosure comprises a twelfth aspect, such as a non-transitory computer-readable medium having program code recorded thereon, the program code comprising:

program code executable by a computer for causing the computer to receiving a transmission configuration from a serving base station for transmission of demodulation reference signals (DMRS) in a subframe, wherein the transmission configuration includes a combination of at least a cyclic shift, an orthogonal cover code (OCC), and a comb value;

program code executable by the computer for causing the computer to prepare a retransmission of the DMRS, Wherein the retransmission is counted by a current transmit counter;

program code executable by the computer for causing the computer to select a transmission comb value for the retransmission, wherein the transmission comb value is selected based on a current number in the current transmit counter, and wherein the transmission comb value is different than an original comb value used in transmission of the DMRS; and program code executable by the computer for causing the computer to transmit the retransmission using the transmission comb value.

Based on the twelfth aspect, the non-transitory computer-readable medium of a thirteenth aspect, wherein the program code executable by the computer for causing the computer to select of the transmission comb value is configured to select a first transmission comb value when the current transmit counter is an odd number, and to select a second transmission comb value different from the first transmission comb value when the current transmit counter is an even number.

The functional blocks and modules described herein may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented through computer-executable instructions in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining a transmission configuration for demodulation reference signals (DMRS) in a subframe of each of a plurality of served user equipments (UEs), wherein the transmission configuration includes a combination of at least a cyclic shift, an orthogonal cover code (OCC), and a comb value; and
   dynamically signaling the transmission configuration to each of the plurality of served UEs, wherein at least one of the transmission configurations assigns a first comb value for a first slot of the subframe and a second comb value for a second slot of the subframe that is different than the first comb value.

2. The method of claim 1, wherein the dynamic signaling includes:
   dynamically transmitting the transmission configuration in an uplink grant to each of the plurality of served UEs.

3. The method of claim 1, wherein the transmission configuration is signaled via a joint coding of the cyclic shift, the OCC, and the comb value.

4. The method of claim 3, wherein the at least one of the transmission configuration assigning the first comb value for the first slot and the second comb value for the second slot includes assignment of a different OCC for layer 1 to 4.

5. The method of claim 4, wherein another transmission configuration assigning a same comb value to the first and second slot includes assignment of a same OCC for layer 1 to 4.

6. The method of one of claims 1-5, wherein the method is performed by a base station.

7. A method of wireless communication, comprising:
   receiving a transmission configuration from a serving base station for transmission of demodulation reference signals (DMRS) in a subframe, wherein the transmission configuration includes a combination of at least a cyclic shift, an orthogonal cover code (OCC), and a comb value;
   preparing a retransmission of the DMRS, wherein the retransmission is counted by a current transmit counter;
   selecting a transmission comb value for the retransmission, wherein the transmission comb value is selected based on a current number in the current transmit counter, and wherein the transmission comb value is different than an original comb value used in transmission of the DMRS; and
   transmitting the retransmission using the transmission comb value.

8. The method of claim 7, wherein the selecting of the transmission comb value includes selecting a first transmission comb value when the current transmit counter is an odd number or selecting a second transmission comb value different from the first transmission comb value when the current transmit counter is an even number.

9. An apparatus configured for wireless communication, comprising:
   means for determining a transmission configuration for demodulation reference signals (DMRS) in a subframe of each of a plurality of served user equipments (UEs), wherein the transmission configuration includes a combination of at least a cyclic shift, an orthogonal cover code (OCC), and a comb value; and dynamically signaling the transmission configuration to each of the plurality of served UEs, wherein at least one of the transmission configurations assigns a first comb value for a first slot of the subframe and a second comb value for a second slot of the subframe that is different than the first comb value.

10. The apparatus of claim 9, wherein the means for dynamic signaling includes:

means for dynamically transmitting the transmission configuration in an uplink grant to each of the plurality of served UEs.

11. The apparatus of claim 10, wherein the transmission configuration is signaled via a joint coding of the cyclic shift, the OCC, and the comb value.

12. The apparatus of claim 11, wherein the at least one of the transmission configuration assigning the first comb value for the first slot and the second comb value for the second slot includes assignment of a different OCC for layer 1 to 4.

13. The apparatus of claim 12, wherein another transmission configuration assigning a same comb value to the first and second slot includes assignment of a same OCC for layer 1 to 4.

14. The apparatus of one of claims 9-13, wherein the apparatus corresponds to a base station.

15. An apparatus configured for wireless communication, comprising:

means for receiving a transmission configuration from a serving base station for transmission of demodulation reference signals (DMRS) in a subframe, wherein the transmission configuration includes a combination of at least a cyclic shift, an orthogonal cover code (OCC), and a comb value;

means for preparing a retransmission of the DMRS, wherein the retransmission is counted by a current transmit counter;

means for selecting a transmission comb value for the retransmission, wherein the transmission comb value is selected based on a current number in the current transmit counter, and wherein the transmission comb value is different than an original comb value used in transmission of the DMRS; and means for transmitting the retransmission using the transmission comb value.

16. The apparatus of claim 15, wherein the means for selecting the transmission comb value is configured to select a first transmission comb value when the current transmit counter is an odd number, and to select a second transmission comb value different from the first transmission comb value when the current transmit counter is an even number.

* * * * *